United States Patent
Bishop et al.

(10) Patent No.: US 7,948,744 B2
(45) Date of Patent: May 24, 2011

(54) MULTI-PURPOSE FLAT PANEL DISPLAY COVER

(75) Inventors: Will Bishop, Noblesville, IN (US); Bill Bose, Indianapolis, IN (US); Michel Cadio, Carmel, IN (US); Mark Galambus, Carmel, IN (US)

(73) Assignee: Shenzhen TCL New Technology Ltd., Shenzhen, Guangdong (CN)

( * ) Notice: Subject to any disclaimer, the term of this patent is extended or adjusted under 35 U.S.C. 154(b) by 68 days.

(21) Appl. No.: 12/447,875

(22) PCT Filed: Nov. 8, 2006

(86) PCT No.: PCT/US2006/043788
§ 371 (c)(1), (2), (4) Date: Apr. 29, 2009

(87) PCT Pub. No.: WO2008/057092
PCT Pub. Date: May 15, 2008

(65) Prior Publication Data
US 2010/0067178 A1 Mar. 18, 2010

(51) Int. Cl.
*G06F 1/16* (2006.01)

(52) U.S. Cl. ............ 361/679.27; 428/336; 345/209; 349/155

(58) Field of Classification Search ............ 361/679.21, 361/679.27, 679.55, 679.05, 679.57, 679.02, 361/679.22, 679.06, 679.46, 679.47; 248/161, 248/917; 16/286; 348/E5.125; 341/22; 428/687, 336, 209; 313/506; 345/176, 102, 345/209, 173, 92; 349/58, 187, 42, 153, 155; 156/345.31

See application file for complete search history.

(56) References Cited

U.S. PATENT DOCUMENTS

| | | | |
|---|---|---|---|
| 5,871,094 A | 2/1999 | Leibowitz | |
| 6,262,886 B1 | 7/2001 | DiFonzo et al. | |
| 6,426,870 B1 | 7/2002 | Oross et al. | |
| 6,636,420 B2 * | 10/2003 | Nakano et al. | 361/679.27 |
| 6,693,367 B1 | 2/2004 | Schmeisser et al. | |
| 6,845,005 B2 | 1/2005 | Shimano et al. | |
| 6,930,881 B2 * | 8/2005 | Karidis et al. | 361/679.55 |
| 7,106,578 B2 * | 9/2006 | Chen | 361/679.21 |
| 7,206,198 B2 | 4/2007 | Wang | |
| 2002/0015095 A1 | 2/2002 | Schilowitz | |
| 2005/0149955 A1 | 7/2005 | Peng | |
| 2007/0211415 A1 | 9/2007 | Seo et al. | |

FOREIGN PATENT DOCUMENTS

| | | |
|---|---|---|
| EP | 1251224 A1 | 10/2002 |
| WO | WO 91/11769 A1 | 8/1991 |
| WO | WO02/098123 A2 | 12/2002 |

OTHER PUBLICATIONS

PCT International Search Report and Written Opinion for PCT/US2006/043788, dated Feb. 22, 2008.

* cited by examiner

*Primary Examiner* — Hung V Duong
(74) *Attorney, Agent, or Firm* — Fletcher Yoder PC

(57) ABSTRACT

Embodiments of the present invention are directed to a multi-purpose flat panel display cover. One embodiment of the present invention may include a cover for a flat panel display, the cover comprising a shield portion configured to protect a flat panel display screen, and a handle portion coupled to the shield portion, wherein the cover is configured to hingedly couple with the flat panel display and rotate into a display support configuration.

19 Claims, 4 Drawing Sheets

MULTI-PURPOSE FLAT PANEL DISPLAY COVER

CROSS-REFERENCE TO RELATED APPLICATIONS

This application is a National Phase 371 Application of PCT Application No. PCT/US06/43788, filed Nov. 8, 2006, entitled "MULTI-PURPOSE FLAT PANEL DISPLAY COVER".

FIELD OF THE INVENTION

The present invention relates generally to multi-purpose flat panel display accessories.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

It is not uncommon for modern displays (e.g., televisions and monitors) to be transported for use in various different environments. For example, a flat panel display that is typically utilized in an enclosed environment (e.g., a home or office) may be transported for use in an outdoor environment (e.g., a camp site or tailgate party). Further, modern displays with their small size and portability even facilitate their use during travel (e.g., in automobiles or on planes). However, while these modern displays are portable, they are often very delicate and can easily be damaged during such transportation. Accordingly, it is desirable to avoid downtime and costly repairs to such displays by providing a system that protects them from minor impacts, dust, spills, and other contaminants during transportation. It is also desirable to provide further protection by facilitating secure handling of the displays during transportation. Further, it is desirable to facilitate setting up the displays in stabilized viewing positions once a destination for use is reached.

SUMMARY OF THE INVENTION

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present invention are directed to a multi-purpose flat panel display cover. One embodiment of the present invention may include a cover for a flat panel display, the cover comprising a shield portion configured to protect a flat panel display screen, and a handle portion coupled to the shield portion, wherein the cover is configured to hingedly couple with the flat panel display and rotate into a display support configuration.

BRIEF DESCRIPTION OF THE DRAWINGS

Advantages of the invention may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
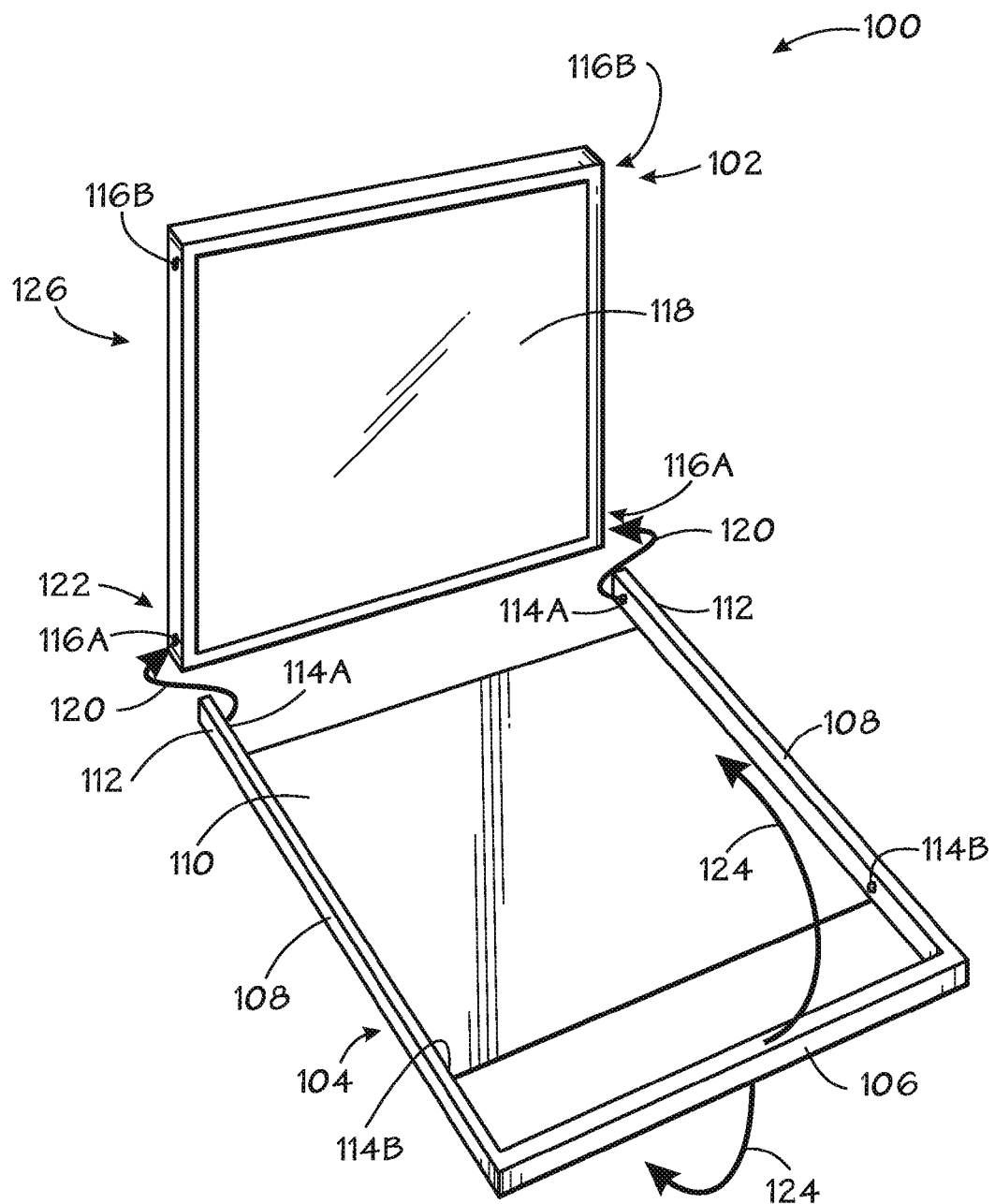
FIG. 1 is a perspective view of a multi-purpose flat panel display system in accordance with an exemplary embodiment of the present invention.

FIG. 1 is a perspective view of a multi-purpose flat panel display system in accordance with an exemplary embodiment of the present invention. The display system is generally designated by reference numeral 100. The display system 100 includes a display 102 and a cover 104. The display 102 may be an LCD, a plasma display, a DLP display, or the like. The cover 104 includes a handle 106, two side components 108, a protective shield 110 disposed between the two side components 108, and connection legs 112 extending from the side components 108. Additionally, the cover includes a first set of lugs 114A configured for insertion into a first set of detents 116A on the display 102 to facilitate pivotal coupling of the display 102 with the cover 104. Further, the cover includes a second set of lugs 114B and a second set of detents 116B to facilitate securing the cover 104 over the display 104 in a closed position. It should be noted that the cover 104 may be composed of a number of protective materials. In one embodiment, the cover 104 is at least partially made of a transparent material. For example, the shield 110 may be composed of transparent plastic to enable viewing of the display screen 118 while it is encased by the cover 104 (e.g., in a closed position).

It should be noted that while the embodiment illustrated in FIG. 1 includes the display 102 as a component of the system 100, in other embodiments the cover 104 may be provided separately from the display 102. Indeed, the cover 104 may be configured to couple to various different types of displays to facilitate using the cover 104 for improved transportation and viewing of displays produced by different manufacturers.

In the embodiment illustrated by FIG. 1, the display 102 is separated from the cover 104. However, as indicated by arrows 120, the display 102 and the cover 104 may be coupled together to form a single functional unit (i.e., the system 100).

Indeed, the cover 104 may be hingedly fastened (i.e., fastened such that rotation about the fastener is facilitated) to the display 102 by securing the lugs 114A disposed on legs 112 of the cover 104 with the detents 116A disposed on the sides of the display 102. These detents 116A and lugs 114A are disposed proximate a bottom 122 of the display 102 to facilitate rotation of the cover 104, as illustrated by arrows 124. The legs 112, the detents 116A and/or the lugs 114A may be formed from a flexible material that allows a user to toollessly couple the cover 104 to the display 102 by sliding the lugs 114A into the detents 116A. In other embodiments, fasteners (e.g., screws, a hinge, a swivel or the like) other than the lugs 114A and detents 116A may be utilized for hingedly coupling the display 102 and the cover 104. It should be noted that some of these different fasteners may require the use of tools to couple the display 102 and cover 104 together. Indeed, the cover 104 may be hingedly coupled to the display 102 in a manner that is essentially permanent. The second set of lugs 114B and detents 116B may couple proximate a top portion 126 of the display 102 to secure the cover 104 in a closed position over the display screen 118.

Figure 2:
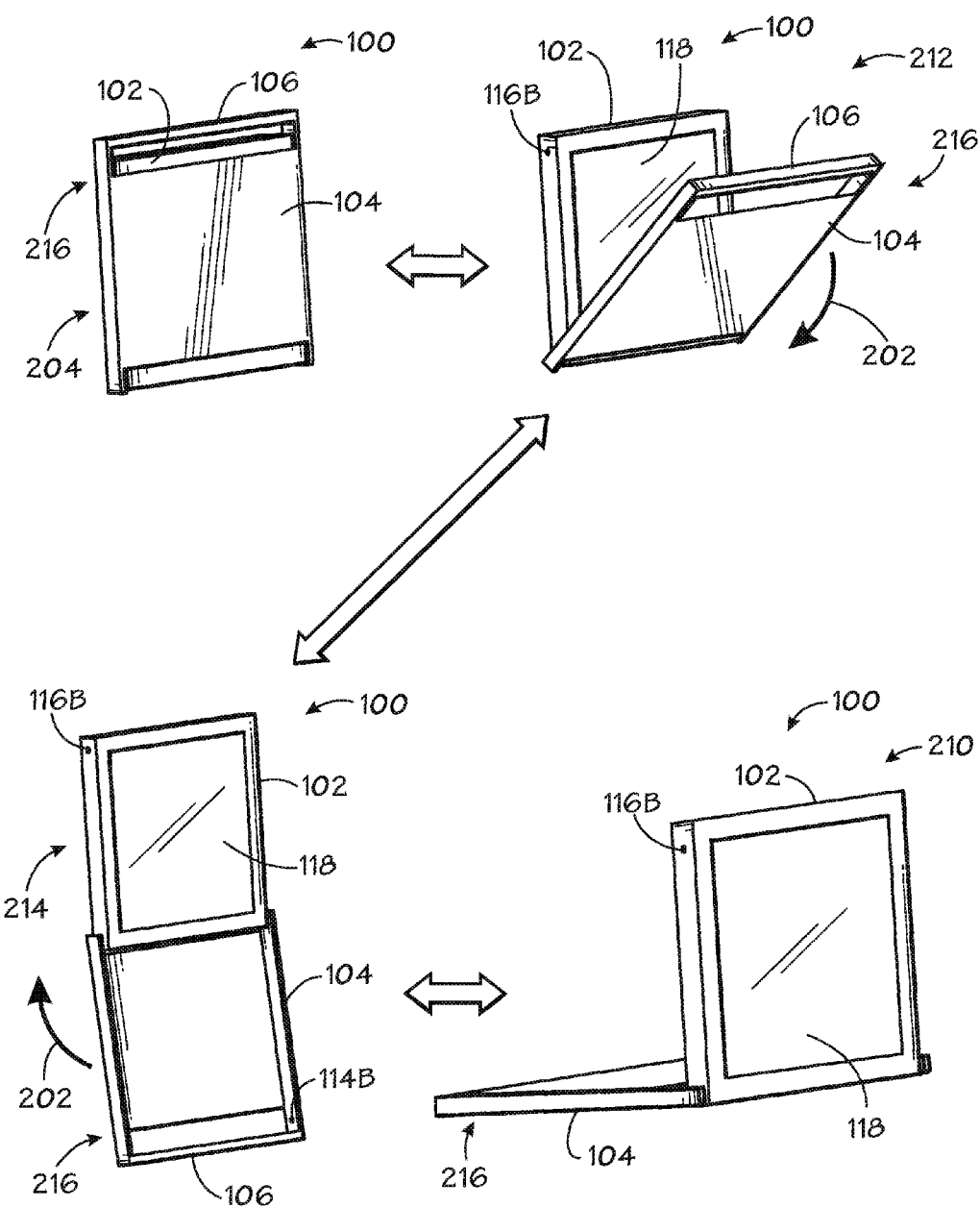
FIG. 2 is a perspective view of four orientations of the display system as it transitions from a closed position to a viewing position in accordance with an exemplary embodiment of the present invention.

FIG. 2 is a perspective view of four orientations of the display system 100 as it transitions from a closed position to a viewing position in accordance with an exemplary embodiment of the present invention. Once the display 102 and the cover 104 are coupled together, the cover 104 may rotate about the display 102, as illustrated by arrows 202. Accordingly, the cover 104 may be positioned about the display 102 into various arrangements or orientations with respect to the display 102. Depending on the selected orientation, the cover 104 may protect the display's screen 118, provide support for viewing the display 102, and/or facilitate handling or transportation of the display 102.

Specifically, in FIG. 2, the display system 100 progresses through a range of positions from a closed orientation 204 to a viewing orientation 210. In the process of transitioning from the closed orientation 204 to the viewing orientation 210, or vice versa, the display system 100 passes through a first transitional orientation 212 and a second transitional orientation 214. Multiple orientations are shown in FIG. 2 to demonstrate the range of movement of the cover 104 with respect to the display 102. The cover 104 acts as a screen cover, a handle, and/or a stand for the display 102 depending on the orientation in which it is positioned. For example, in the closed orientation 204, the cover 104 protectively shields the screen 118 and properly orients the handle 106 to facilitate transportation. In the viewing orientation 210, the cover 104 provides a base for the display 102 to facilitate balancing the display 102 in an upright orientation for viewing.

In the closed position 204, the second set of lugs 114B and detents 116B may be utilized to secure an upper portion 216 of the cover 104 to the top portion 126 of the display 102 and keep the cover 104 in position over the display screen 118. In other embodiments, different securing mechanisms (e.g., a latch or a snap) may be utilized to keep the cover 104 in place over the display 102 and in the closed orientation 204. Such mechanisms may be configured for toolless decoupling such that the upper portion 216 of the cover 104 may be disconnected from the display 102 and the cover 104 may be rotated about the first set of lugs 114A and detents 116A into the viewing orientation 210, as illustrated by arrows 202. Once the display system 100 is in the viewing orientation 210, the cover 104 is configured to support the display 102 for viewing by a user.

Figure 3:
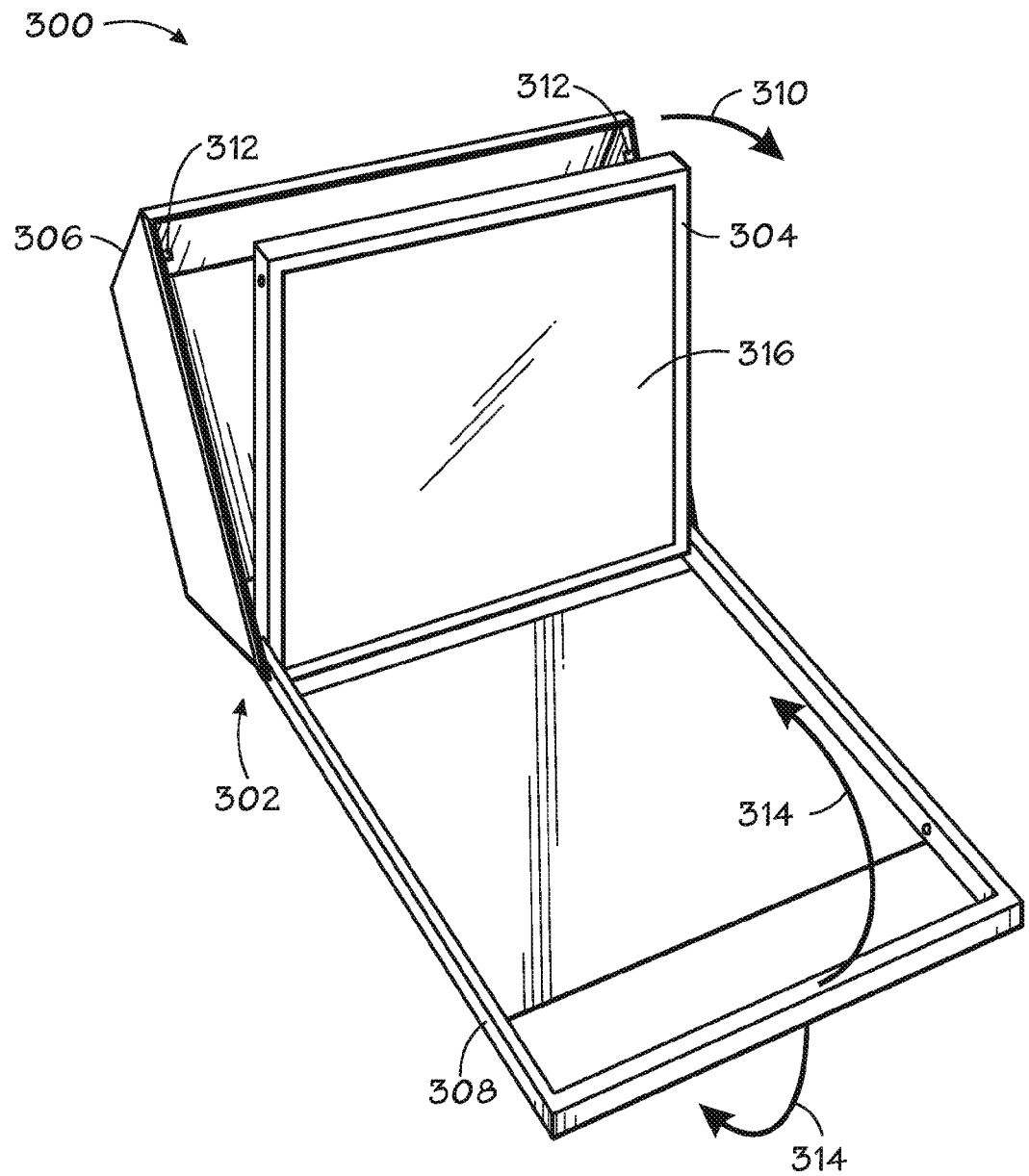
FIG. 3 is a perspective view of another multi-purpose flat panel display system in accordance with an exemplary embodiment of the present invention.

FIG. 3 is a perspective view of another multi-purpose flat panel display system in accordance with an exemplary embodiment of the present invention. The display system illustrated in FIG. 3 is generally designated by reference number 300. System 300 includes a two-piece cover 302 disposed about a display 304, wherein the two-piece cover 302 facilitates protection of both front and back portions of the display 304. The two-piece cover 302 includes a back shield 306 and a front shield 308. The back shield 306 is configured to extend over the rear of the display 304 and may rotate into position, as illustrated by arrow 310. The back shield 306 may couple to the back of the display 304 with any of various coupling mechanisms. For example, the back shield 306 may snap fit to the display 304 via a set of snap mechanisms 312. In some embodiments, the back shield 306 may be integral with the display 304. In other embodiments, the back shield 306 may be separate from the display 304 and configured to accommodate displays made by different manufacturers. The front shield 308 may rotate about the display 304, as illustrated by arrows 314. When the front shield 308 is arranged in a closed position (e.g., the front shield 308 is positioned adjacent the front of the display 304 in a substantially parallel orientation), it may protect a front screen 316 of the display 304. When the front shield 314 is rotated underneath the display 304 into a display support configuration (e.g., in a substantially perpendicular orientation with respect to the display 304), it may operate as a support for the display 304.

Figure 4:
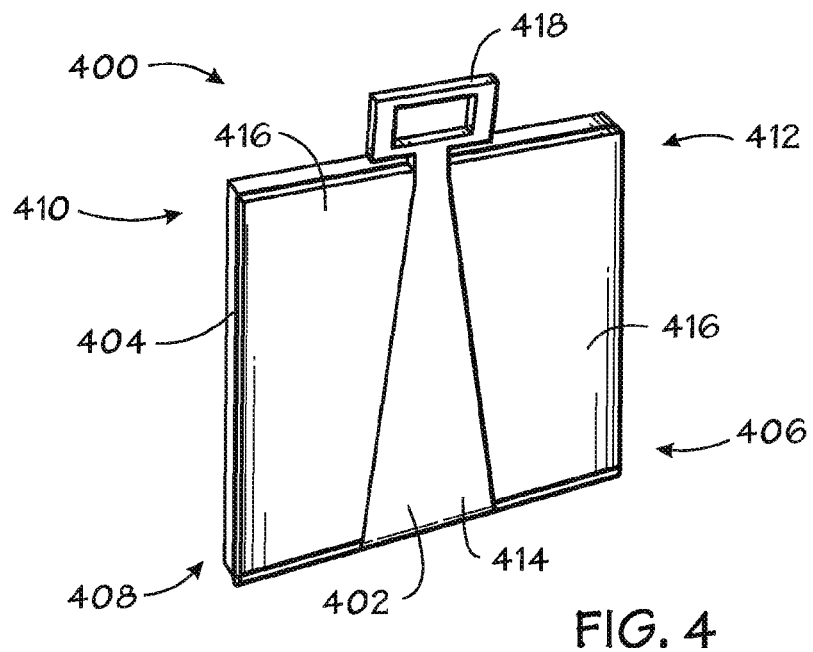
FIG. 4 is a perspective view of another multi-purpose flat panel display system in accordance with an exemplary embodiment of the present invention.

FIG. 4 is a perspective view of another multi-purpose flat panel display system in accordance with an exemplary embodiment of the present invention. The display system illustrated in FIG. 4 is generally designated by reference number 400 and is shown in a closed orientation. System 400 includes a three-piece cover 402 coupled to a display 404. In the closed orientation, a bottom portion 406 of the three-piece cover 402 is hingedly coupled to a bottom portion 408 of the display 404 and a top portion 410 of the three-piece cover 402 is removably coupled to a top portion 412 of the display 404. The three-piece cover 402 includes a center piece 414 and two side pieces 416. The center piece 414 may couple with each of the two side pieces 416 to form a seal in the closed orientation such that the center piece 414 and the two side pieces 416 cooperate to provide a protective cover for the display 404. Additionally, the three-piece cover 402 may facilitate secure handling of the display 404 in the closed position. For example, the center piece 414 of the three-piece cover 402 includes a handle 418 disposed proximate the top portion 410 of the three-piece cover 402. In the closed orientation, the handle 418 is properly arranged such that a user may grasp the display 404 and carry it to a different location using the handle 418. During transport of the display 404 in the closed orientation, the three-pieced cover 402 serves to protect the display 404 from impacts and contaminants (e.g., dust and liquids).

Figure 5:
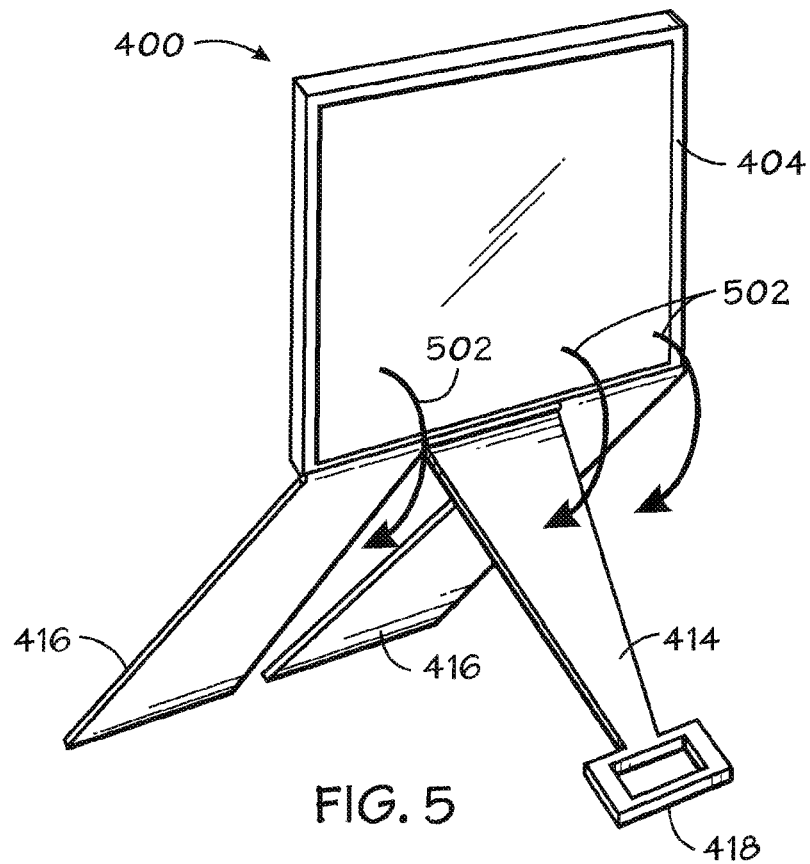
FIG. 5 is a perspective view of the multi-purpose flat panel display system of FIG. 4 arranged in a viewing orientation in accordance with an exemplary embodiment of the present invention.

FIG. 5 is a perspective view of the multi-purpose flat panel display system 400 arranged in a display support configuration in accordance with an exemplary embodiment of the present invention. The center piece 414 and two side pieces 416 of the three-piece cover 402 may be rotated, as illustrated by arrows 502, to arrange the system 400 in the viewing orientation. In the illustrated embodiment, the two side pieces 416 rotate such that the portions that coupled to the top 412 of the display 404 are arranged below and slightly behind the display 404. Similarly, the center piece 414 rotates such that the portion that coupled to the top 412 of the display 404 is arranged below and slightly in front of the display 404. Each of the pieces of the three-piece cover 402 may be locked into position in a tripod arrangement to provide support for the display 404. Accordingly, in the viewing orientation, the three-piece cover 402 operates as a three-legged base. This may facilitate viewing of the display 404. Other embodiments may include various mechanisms for folding the cover into a base.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A cover for a flat panel display, the cover comprising:
   a shield portion configured to protect a flat panel display screen;
   a handle portion coupled to the shield portion, wherein the cover is configured to hingedly couple with the flat panel display; and
   two side components and a center component configured to rotate into a tripod configuration to support the flat panel display.

2. The cover of claim 1, comprising a back shield portion configured to protect a rear of the flat panel display.

3. The cover of claim 1, wherein the two side components and the center component combine to provide the shield portion.

4. The cover of claim 1, wherein the handle portion is configured to facilitate transportation of the flat panel display when the flat panel display and the cover are arranged in a closed orientation.

5. The cover of claim 1, wherein the shield portion comprises a clear material.

6. The cover of claim 1, comprising a set of lugs configured to engage a set of detents on the flat panel display to retain the flat panel display and the cover in a closed orientation.

7. A system, comprising:
   a display; and
   a cover hingedly coupled to the display, the cover comprising:
      a shield portion configured to protect a flat panel display screen;
      a handle coupled to the shield portion, wherein the cover is configured to rotate about the display into a closed orientation and wherein the cover is configured to rotate about the display into a viewing orientation; and
      two side components and a center component configured to rotate into a tripod configuration to support the display.

8. The system of claim 7, wherein the cover comprises a back shield portion configured to protect a rear of the flat panel display.

9. The system of claim 7, wherein the shield portion of the cover comprises the two side components and the center component configured to rotate into the tripod configuration to support the display.

10. The system of claim 7, wherein the handle is configured to facilitate transportation of the display when the display and the cover are arranged in the closed orientation.

11. The system of claim 7, wherein the shield portion comprises a clear material.

12. The system of claim 7, comprising a set of snaps disposed on the cover and configured to engage the display to retain the display and the cover in the closed orientation.

13. The system of claim 7, comprising a set of lugs disposed on the cover and configured to engage a set of detents on the display to hingedly couple the cover and the display.

14. A system, comprising:
   a display; and
   a cover configured to rotate about the display into a closed orientation and into a viewing orientation, the cover comprising:
      a first side cover piece hingedly coupled to the display;
      a second side cover piece hingedly coupled to the display; and
      a center cover piece disposed between the first and second side cover pieces and hingedly coupled to the display, wherein the center cover piece is configured to interlock with the first and second side pieces to protectively cover a display screen in the closed orientation.

15. The system of claim 14, wherein the center piece includes a handle portion configured to facilitate transportation of the display.

16. The system of claim 15, wherein the handle portion is configured to extend above a top of the display when the cover is in the closed orientation.

17. The system of claim 14, wherein the cover is configured to form a tripod in the viewing orientation wherein the first and second side pieces extend below and behind the display and the center piece extends below and in front of the display.

18. The system of claim 14, wherein the cover is configured for toolless attachment and detachment from the display.

19. The system of claim 14, wherein the cover comprises clear material.

\* \* \* \* \*